(12) United States Patent
Watling (10) Patent No.: US 9,821,844 B2
(45) Date of Patent: Nov. 21, 2017

(54) CONTINUOUSLY VARIABLE SPEED TRANSMISSION AND STEERING DIFFERENTIAL

(71) Applicant: Shawn Watling, Warsaw (CA)

(72) Inventor: Shawn Watling, Warsaw (CA)

(*) Notice: Subject to any disclaimer, the term of this patent is extended or adjusted under 35 U.S.C. 154(b) by 162 days.

(21) Appl. No.: 14/718,983

(22) Filed: May 21, 2015

(65) Prior Publication Data

US 2016/0016608 A1    Jan. 21, 2016

Related U.S. Application Data

(60) Provisional application No. 62/003,199, filed on May 27, 2014.

(51) Int. Cl.
| | |
|---|---|
| *F16H 48/12* | (2012.01) |
| *B62D 11/10* | (2006.01) |
| *F16H 9/18* | (2006.01) |
| *B62D 5/02* | (2006.01) |
| *F16H 9/16* | (2006.01) |

(52) U.S. Cl.
CPC .............. *B62D 11/105* (2013.01); *B62D 5/02* (2013.01); *F16H 9/18* (2013.01); *F16H 2009/163* (2013.01)

(58) Field of Classification Search
CPC . F16H 9/10; F16H 37/086; F16H 9/16; F16H 9/20; B62D 11/105

USPC .......................................................... 74/650
See application file for complete search history.

(56) References Cited

U.S. PATENT DOCUMENTS

| 1,664,349 | A | * | 3/1928 | Burrow ..................... | F16H 9/16 |
| | | | | | 474/29 |
| 2,213,778 | A | * | 9/1940 | Yamanaka ................ | F16H 9/10 |
| | | | | | 474/54 |
| 2,938,408 | A | * | 5/1960 | Uher ......................... | F16H 9/16 |
| | | | | | 180/6.2 |
| 3,131,581 | A | * | 5/1964 | Graybill ............. | F16H 37/0846 |
| | | | | | 474/17 |
| 3,715,928 | A | * | 2/1973 | Case ........................ | F16H 3/00 |
| | | | | | 474/1 |
| 4,781,656 | A | * | 11/1988 | Brackett .................. | F16H 9/10 |
| | | | | | 474/29 |

\* cited by examiner

*Primary Examiner* — Ha D Ho
(74) *Attorney, Agent, or Firm* — Eric L. Lane; Green Patent Law (57) ABSTRACT

A continuously variable speed transmission and steering differential having a central drive axle, two pairs of sheaves and two shift arms. The drive axel is driven by an external power source. The two pairs of sheaves, left and right, are mounted to the drive axel. Each pair of sheaves includes a fixed drive sheave and a movable drive sheave. Each movable drive sheave is positioned by a shift arm. Shifting the shift arms left or right varies the gear ratio between the left and right pair of sheaves thereby providing steering control. Narrowing the distance between the shaft arms increases the gear ratio and consequently puts the transmission into a higher gear, thereby providing speed control.

1 Claim, 15 Drawing Sheets

CONTINUOUSLY VARIABLE SPEED TRANSMISSION AND STEERING DIFFERENTIAL

This application claims priority from previously filed provisional application No. 62/003,199 titled CONTINUOUSLY VARIABLE SPEED TRANSMISSION AND STEERING DIFFERENTIAL under the name Shawn Watling on May 27, 2014.

FIELD OF THE INVENTION

The present concept relates to continuously variable transmissions and more specifically relates to a continuously variable speed transmission combined with a steering differential.

SUMMARY OF THE INVENTION

A continuously variable speed transmission and steering differential having a central drive axle, two pairs of sheaves and two shift arms. The drive axel is driven by an external power source. The two pairs of sheaves, left and right, are mounted to the drive axel. Each pair of sheaves includes a fixed drive sheave and a movable drive sheave. Each movable drive sheave is positioned by a shift arm. Shifting the shift arms left or right varies the gear ratio between the left and right pair of sheaves thereby providing steering control. Narrowing the distance between the shaft arms increases the gear ratio and consequently puts the transmission into a higher gear, thereby providing speed control.

BRIEF DESCRIPTION OF THE DRAWINGS

The present concept will be described by way of example only with reference to the following drawings in which.

DETAILED DESCRIPTION OF THE PREFERRED EMBODIMENTS

The present concept a continuously the continually variable speed transmission and steering differential shown generally as 100 in FIGS. 1 through 7 and includes the following major components.

The major frame members 101 include the centre chassis support 102 having mounted on each side thereof a right floating arm 104 and a left floating arm 106. Mounted near the rear section 103 of continuously variable speed transmission and steering differential 100 is drive axle 108 which has mounted thereon left fixed drive sheave 110, left floating drive sheave 114, right fixed drive sheave 112, and right floating drive sheave 116.

Figure 7:
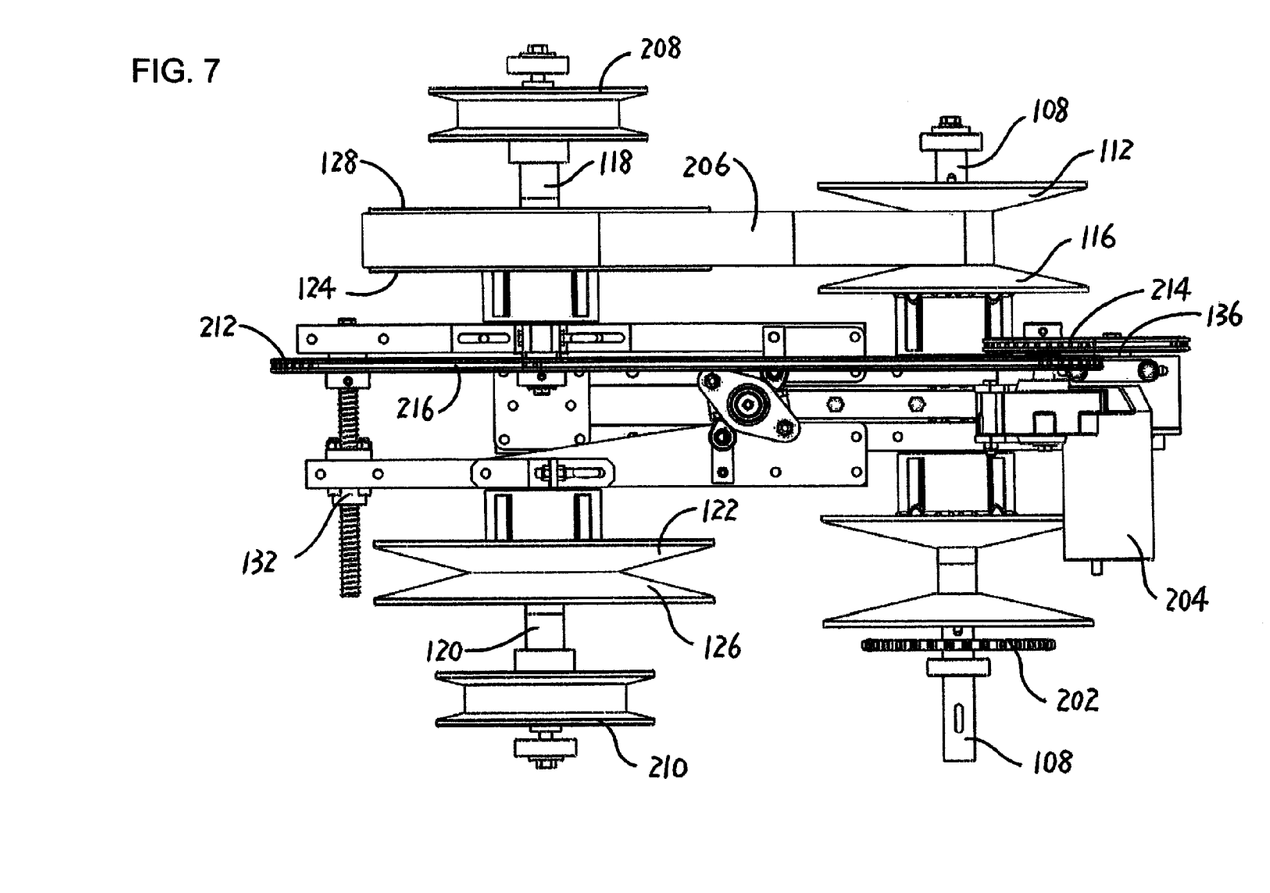
FIG. 7 is a schematic top plan view of the continuously variable speed transmission and steering differential shown together with the driven pulleys mounted on the driven axles as well as the ball screw actuator for moving the floating arms relative to each other.

Not shown in FIGS. 1 to 6 however shown in FIG. 7 is drive sprocket 202 which is mounted onto drive axle 108 which receives power from for example an internal combustion engine and/or from an electric engine and transmits that power to the drive axle 108 through drive sprocket 102. In other words power is received from an external power source such as an internal combustion engine or an electric engine via drive sprocket 202 which drives drive axle 108. The reader will note that the left and right drive sheaves are connected to a common drive axle 108 which is mounted with bearings to centre chassis support 102 as well as right floating arm 104 and left floating arm 106.

Looking now to forward section 105 of continuously variable speed transmission and steering differential 100 there are two half shafts mounted onto the centre chassis support 102 and right and left floating arms 104 and 106 namely right driven axle 118 and left driven axle 120. Right driven axle 118 is mounted onto right finger 111 of centre chassis support 102 and also onto right floating arm 104 using bearings typically known in the art.

Similarly left driven axle 120 is mounted onto left finger 113 of centre chassis support 102 as well as onto left floating arm 106 again using bearings typically used in the art.

Right driven axle 118 and left driven axle 120 rotate independently of each other. It is the difference in speed of the rotation between right driven axle 118 and left driven axle 120 which provides steering response.

The gap or the distance between right floating arm 104 and left floating arm 106 is controlled and actuated by rear ball screw shaft 134 which is attached to rear ball screw nut 136 and front ball screw shaft 130 which is attached to front ball screw nut 132. The biasing means shown in the diagrams is a ball screw type advancing and retraction means however other biasing means for regulating the gap or the distance between right floating arm 104 and left floating arm 106 could for example be carried out with hydraulic or pneumatic cylinders or other mechanical advancement and retraction means which are known in the art. The absolute gap between right floating arm 104 and left floating arm 106 controls the gear position or the speed at which the right driven axle 118 and the left driven axle 120 are driven at.

Right driven axle 118 includes right floating driven sheave 128 and right fixed driven sheave 124. Left driven axle 120 includes left fixed driven sheave 122 and left floating driven sheave 126.

The position of centre chassis support 102 relative to both the right floating arm 104 and the left floating arm 106 is controlled by moving differential bell crank 142 which in turn moves differential rocker 138 which in turn urges differential rocker link 140 thereby varying the relative gap between firstly right floating arm 104 and centre chassis support 102 and secondly between left floating arm 106 and centre chassis support 102. Steering push rod 150 which is connected at one end to a steering wheel and/or handle bar is not shown and is connected at the other end to differential bell crank 142 which pivots about bell crank pivot point 144 thereby actuating differential rocker links 140 which in turn move right floating arm 104 and left floating arm 106 in opposite directions relative to centre chassis support 102.

Referring now to FIG. 7 you will note that 2 additional pulleys are shown which are not depicted in FIGS. 1 through 6 namely right driven pulley 208 mounted onto right driven axle 118 and left driven pulley 210 mounted on left driven axle 120. Right and left driven pulleys 208 and 210 would ultimately be connected via belts or chains or other known means to for example the drive wheels or the drive track of a vehicle. It is contemplated that the vehicle would have separately or independently driven left and right wheels or tracks. In this way the speed of the vehicle is controlled by the rate of rotation of right driven pulley 208 and left driven pulley 210 and steering is accomplished by varying the relative rate of rotation of right driven pulley 208 relative to left driven pulley 210. For example by driving right driven pulley 208 faster than left driven pulley 210 one can accomplish a left turn. By driving left driven pulley 210 more quickly than right driven pulley 208 one can accomplish a right turn.

Additionally an example of an actuation method for activating rear ball screw shafts 134 and front ball screw shafts 130 is shown. Namely a ball screw actuator 204 which could be in the form of a stepper motor or other known method of activation in the industry would be connected by a sprocket and chain to front ball screw sprocket 212 and a rear ball screw sprocket 214 to rotateably urge rear ball screw shaft 134 and front ball screw shaft 130 thereby varying the gap or the relative distance between right floating arm 104 and left floating arm 106.

FIG. 7 also shows a belt 206 in position mounted onto right driven sheaves 124 and 128 as well as onto left drive sheaves 112 and 116. Additionally there is a front ball screw chain 216 and a rear ball screw chain 217, belt tensioners 250, and belt tensioner springs 252. Ball screw actuator 204 through a gearbox 254 drives front and rear ball screw chains 216 and 217.

In FIG. 7 for example the rear section 103 drive sheaves are shown in open position whereas the forward section driven sheaves 128 and 118 are shown in a relatively closed position. This would correspond to a low gear position of the continuously variable speed transmission.

Figure 1:
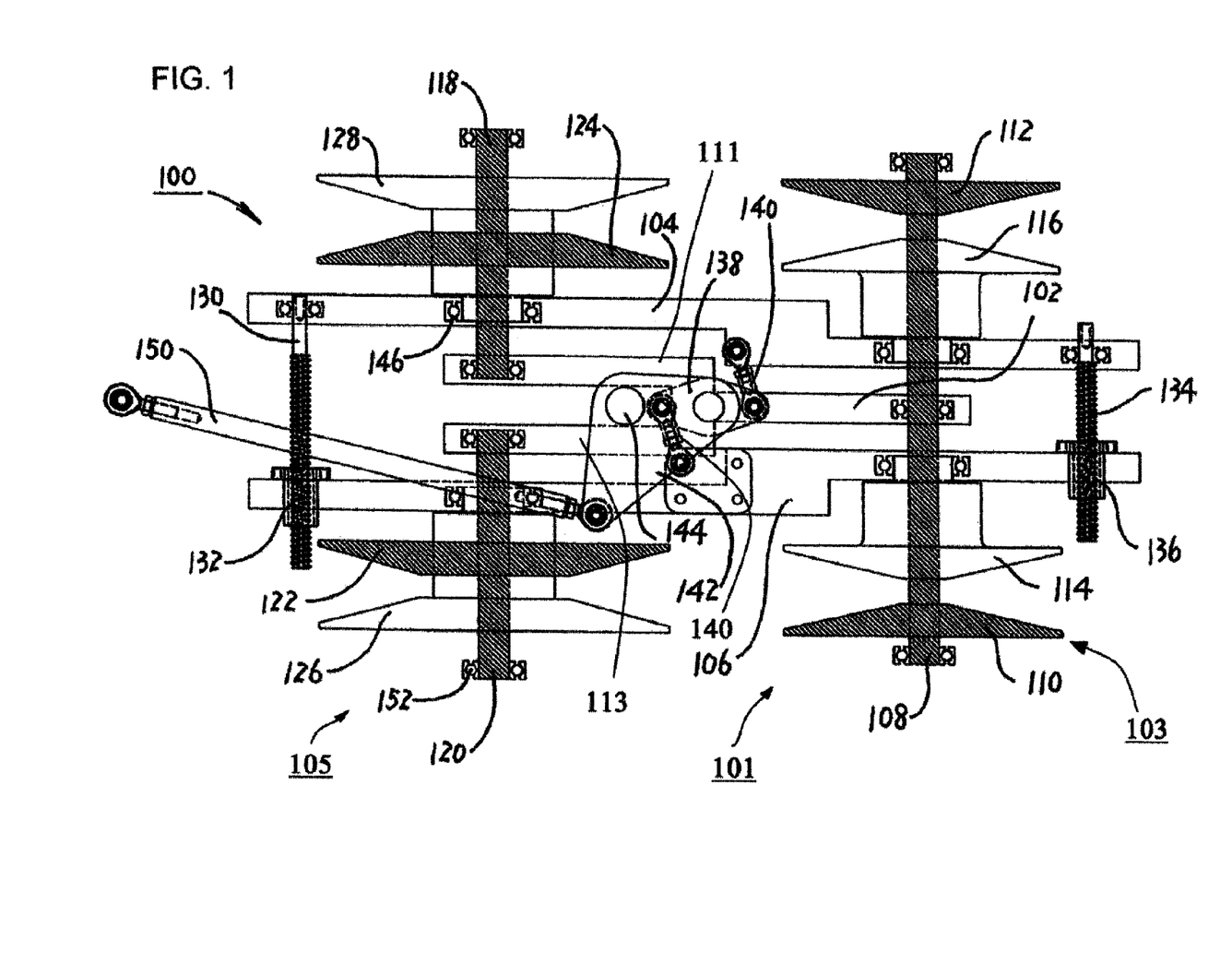
FIG. 1 is a schematic cross plan view of the continuously variable speed transmission and steering differential with the steering shown in the straight position.
Figure 2:
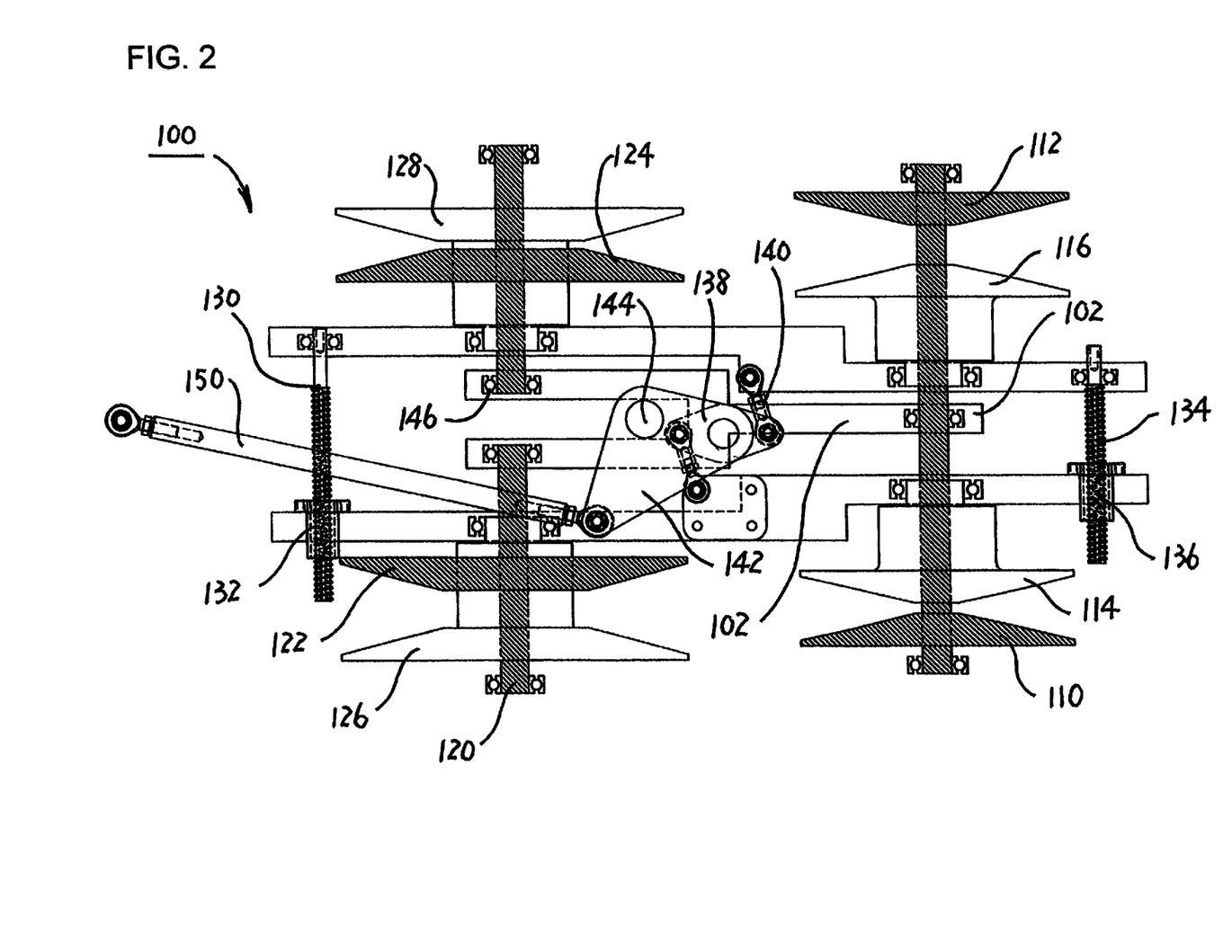
FIG. 2 is a schematic cross plan view of the continuously variable speed transmission and steering differential with the steering shown in the right turned position.
Figure 3:
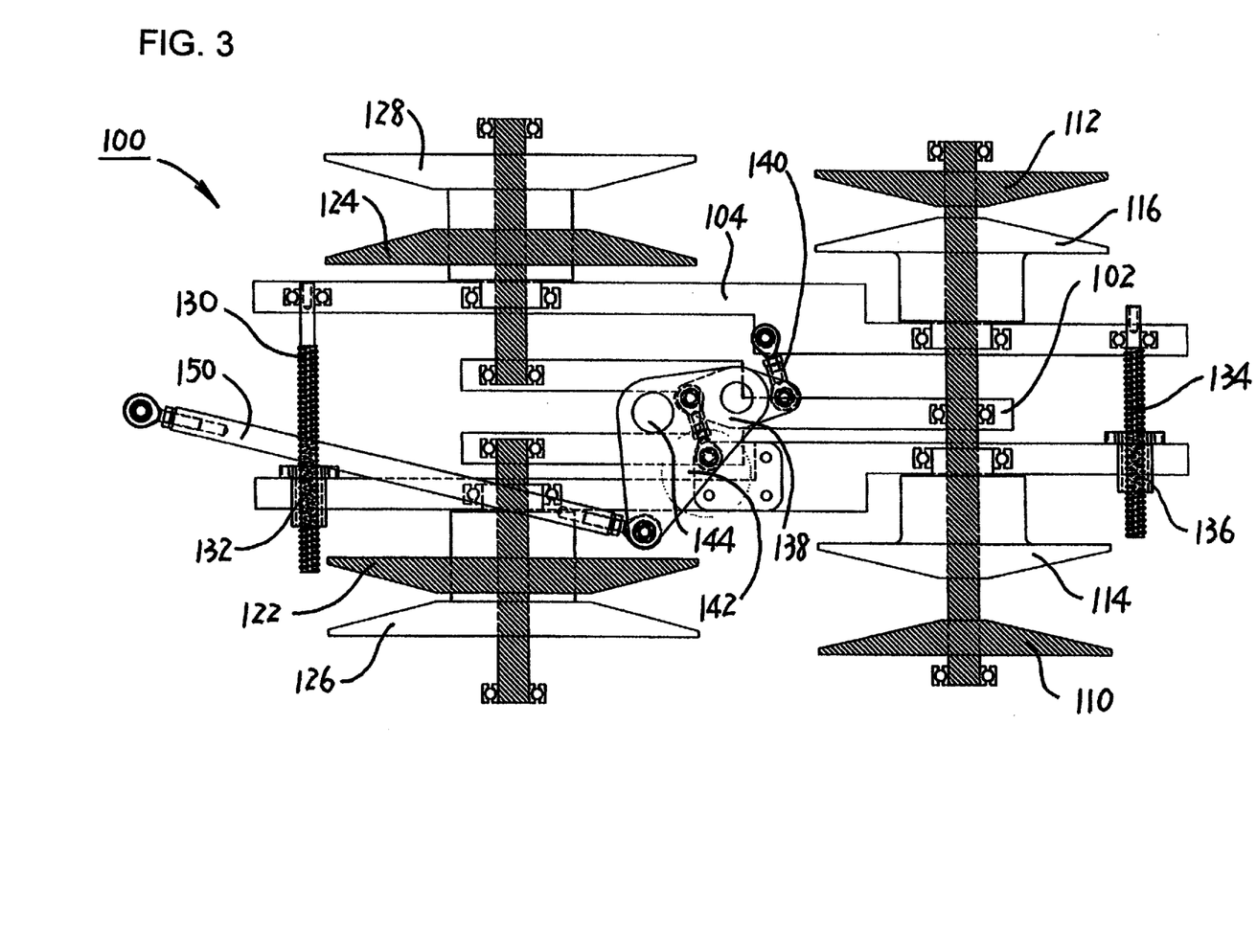
FIG. 3 is a schematic cross plan view of the continuously variable speed transmission and steering differential with the steering shown in the left turned position.

Referring now to FIGS. 1, 2 and 3 which show three example positions for steering.

Referring now to FIG. 1 the centre chassis support is centred relative to both the right floating arm 104 and the left floating arm 106. In this position both the left and the right driven sheaves are turning at approximately the same rate of rotation and therefore the steering of the vehicle is approximately straight.

Referring now to FIG. 2 the reader will note that by rotation of differential bell crank 142 which in turn urges differential rocker links 140 to displace right floating arm 104 closer to centre chassis support 102 and displaces left floating arm 106 further away from centre chassis support 102 thereby causing the various sheaves to open and close relative together as shown in the drawings thereby creating a right turn condition.

FIG. 3 shows the positioning of the centre chassis support 102 relative to right floating arm 104 and left floating arm 106 creating a left turn condition.

In this manner the reader will note that by pivoting differential bell crank 142 with for example a steering push rod 150 one can accomplish a straight steering condition or a right turn steering condition and/or a left turn steering condition by simply moving the right floating arm 104 and the left floating arm 106 relative to the centre chassis support 102 thereby altering the gap between the sheaves of both the rear section 103 and the forward section 105 as shown in drawings 1, 2 and 3.

Figure 4:
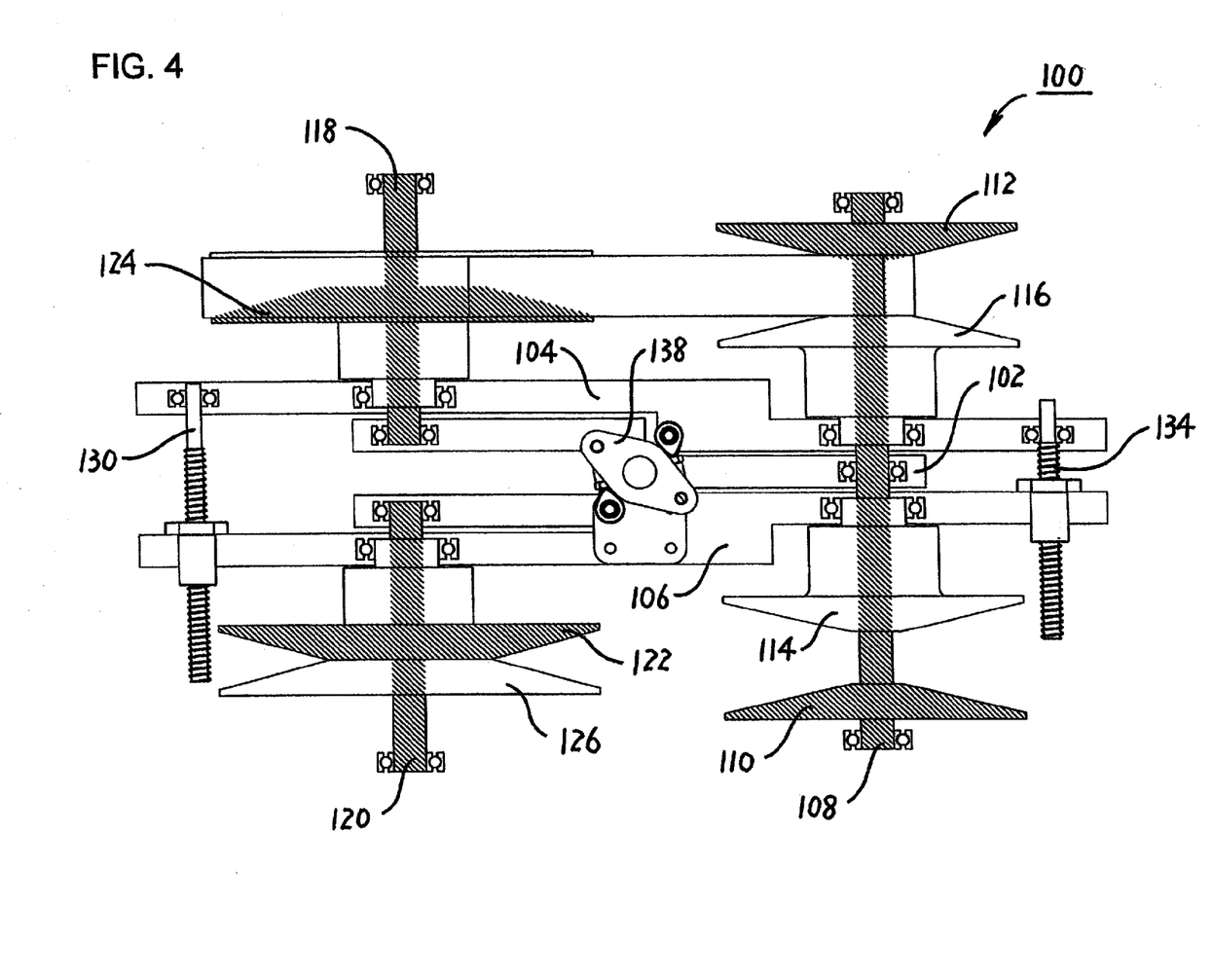
FIG. 4 is a schematic cross plan view of the continuously variable speed transmission and steering differential shown in the lowest gear position.

Referring now to FIG. 4 gear selection is accomplished by altering the gap and/or the relative distance between the right floating arm and the left floating arm 106.

For example in FIG. 4 there is a minimal gap between right floating arm 104 and left floating arm 106 and this is accomplished by turning rear ball screw shaft 134 and front ball screw shaft 130 such that the right floating arm 104 and the left floating arm 106 come in as close as possible in proximity to each other. This would represent a low gear position in that the rear section 103 drive sheaves are as open as possible whereas the forward section 105 driven sheaves are in as closed position as possible thereby creating a lowest gear or slow position.

Figure 5:
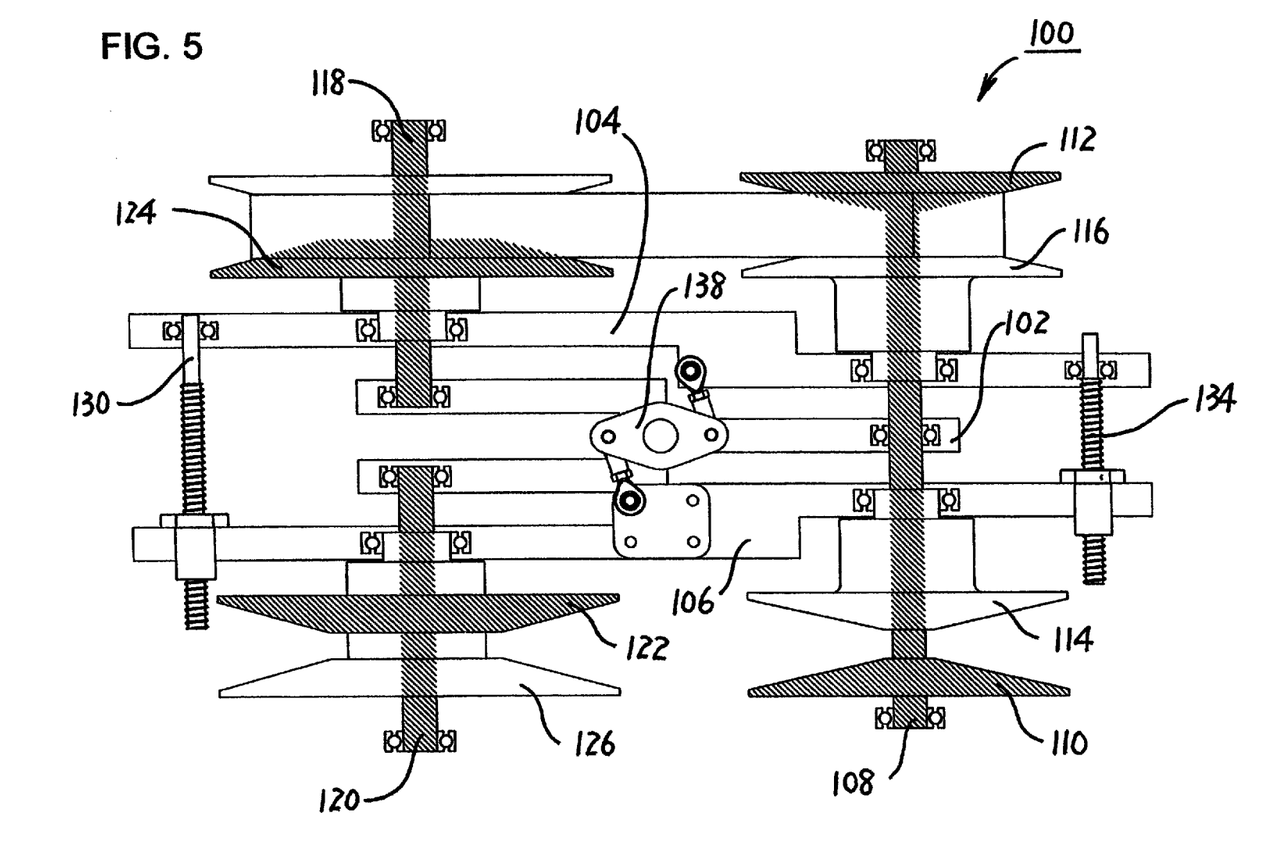
FIG. 5 is a schematic cross plan view of the continuously variable speed transmission and steering differential shown in a medium gear position.
Figure 6:
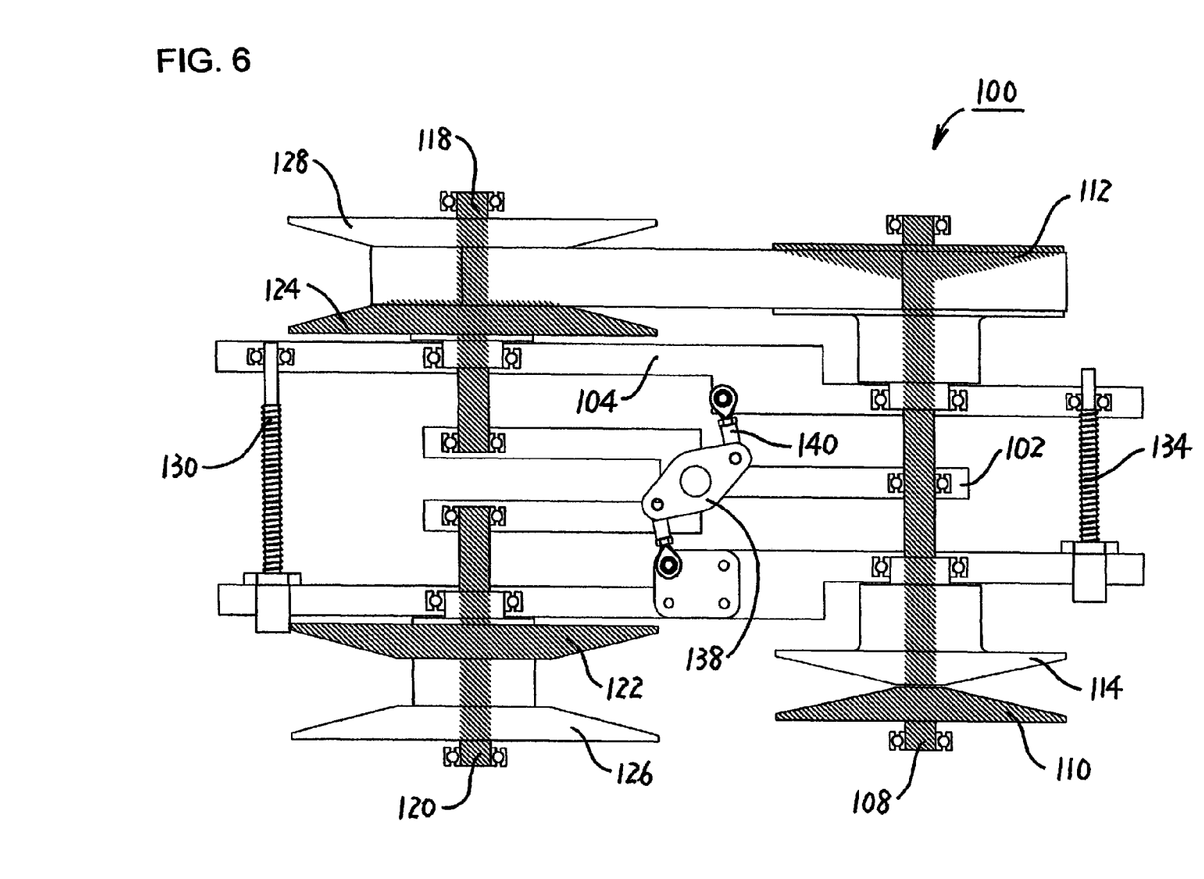
FIG. 6 is a schematic cross plan view of the continuously variable speed transmission and steering differential shown in the highest gear position.

Referring now to FIG. 5 the rear ball screw shaft 134 and the front ball screw shaft 130 have been advanced such there is now a greater gap and/or relative distance between right floating arm 104 and left floating arm 106 thereby closing the gap between the rear section 103 drive sheaves and simultaneously slightly opening the gap between the forward section 105 driven sheaves thereby creating a greater rotational speed at both the right driven axle 118 and the left driven axle 120 which are ultimately connected to the drive wheels and/or tracks of the vehicle.

Referring now to FIG. 6 once again the rear ball screw shaft 134 and front ball screw shaft 130 are actuated to increase the relative distance or the gap between the right floating arm 104 and the left floating arm 106 to a maximum position which represents the highest gear wherein the gap between the rear section 103 drive sheaves is minimized and the gap between the forward section 105, driven sheaves is maximized thereby creating the greatest rotational speed of the right driven axle 118 and the left driven axle 120. This would be the highest gear position to produce the maximum speed condition.

Another embodiment of the present concept that a continuously variable speed transmission and steering differential is shown general as 300 includes the following major components namely; drive axle 302 which is fixed to the chassis and rotates on bearings.

Drive axle 302 has mounted thereon left and right moveable drive sheaves 304, left and right fixed drive sheaves 306, left and right shift arms 308 and cog pulley 310.

Figure 8:
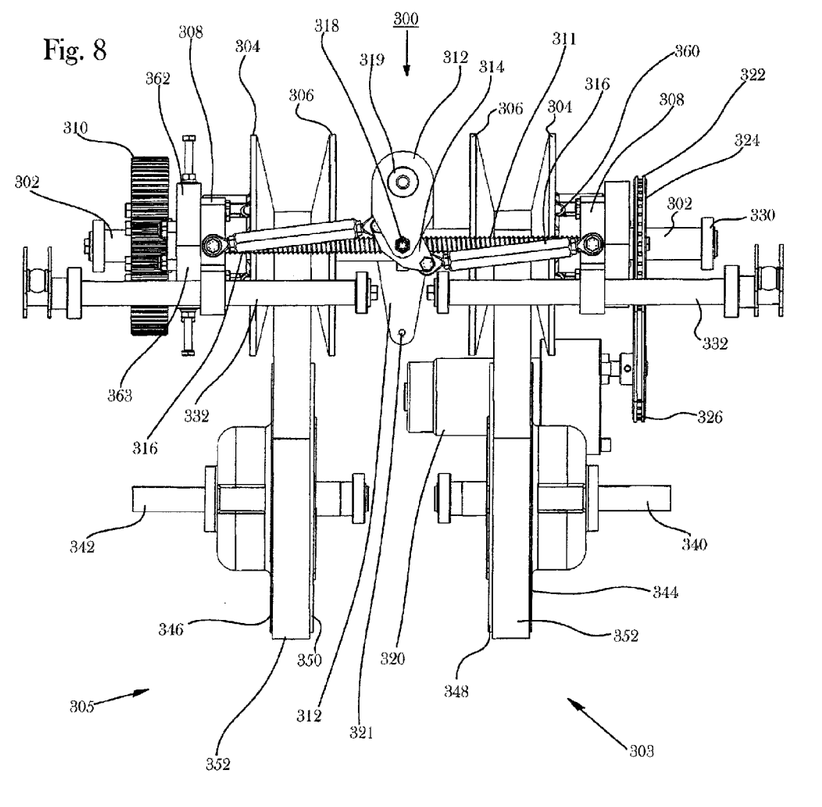
FIG. 8 is a schematic back plan view of another embodiment of a continuously variable speed transmission and steering differential shown together with drive sheaves and driven sheaves, shown in low gear.
Figure 9:
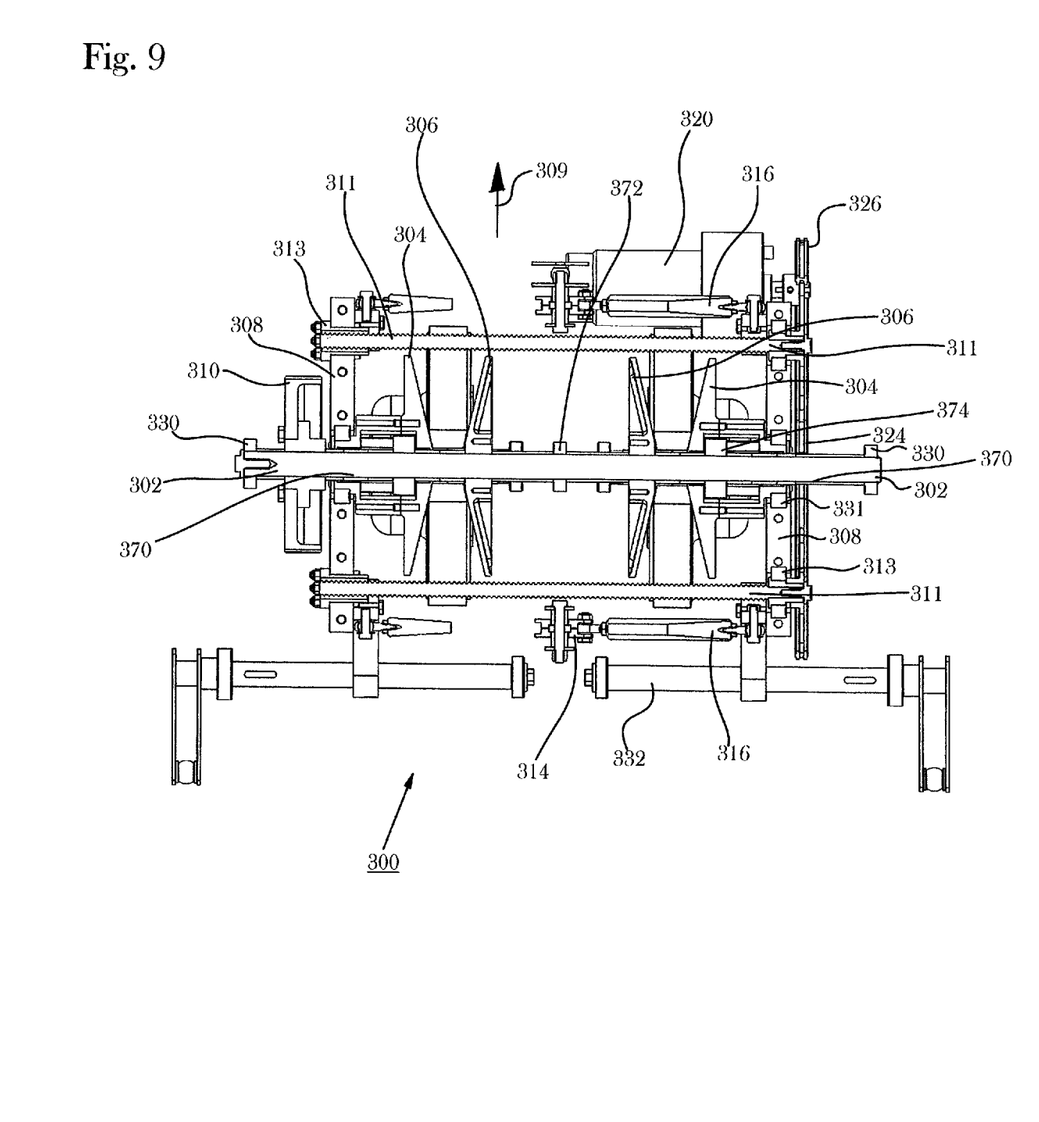
FIG. 9 is a partial top schematic cross sectional view of the embodiment shown in FIG. 8 taken through the drive axle showing the drive sheaves, the shifting mechanism, and the differential mechanism.
Figure 10:
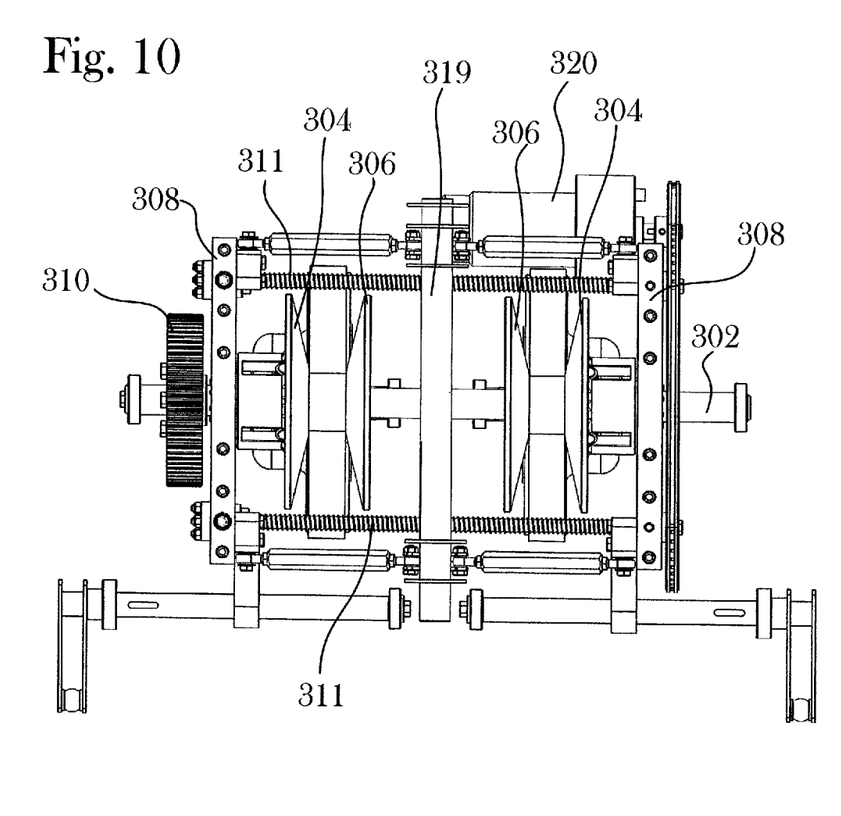
FIG. 10 is a top plan view of the embodiment shown in FIG. 8.

Cog pulley 310 receives a cog belt from a motor not shown in FIGS. 8 and 9 which drives drive axle 302.

Continuously variable speed transmission and steering differential 300 includes two major mechanisms namely shift mechanism 303 and differential mechanism 305.

First of all shift mechanism 303 includes speed change motor 320, chain 324, sprockets 322, motor sprockets 326 shift arm cap 362 and shift arm base 363.

Speed change motor 320 receives signals from an operator to rotate motor sprocket 326 which in turn moves chain 324 and sprockets 322 which in turn rotate ball screw shafts 311 which in turn moves simultaneously shift arms 308 together thereby controlling the width or the spacing between the moveable drive sheaves 304 and the fixed drive sheaves 306 thereby effecting gear changes.

The reader will note that there are two moveable drive sheaves 304 on both the right and left side of the continuously variable speed transmission and steering differential 300.

By bringing shift arms 308 in closer proximity to each other by turning ball screw shafts 311 one can narrow the width between the moveable drive sheave and the fixed drive sheave 306 thereby increasing the gear ratio between the drive axle 302 and the right and left driven axles 340 and 342.

One can lower the gear ratio by reversing the direction of rotation of speed change motor 320 which in turn separate the left and right shift arms 308 thereby increasing the distance between the moveable drive sheaves 304 and the fixed drive sheaves 306. Low gear for example is shown in FIG. 8 and high gear is shown in FIG. 9.

The reader will note that during the speed change operation shift mechanism 303 simultaneously moves both the left and right shift arms in unison in other words the separation between the moveable drive sheaves 304 and the fixed drive sheaves 306 on both the left and right side remains the same. The amount of speed change will be the same on both the right driven axle 340 and the left driven axle 342.

A differential mechanism shown generally as 305 includes the following major components namely a differential arm 312 which is connected to a link arm 314 at the link arm pivot 318 which in turn is connected to left and right differential links 316 which in turn is connected to shift arms 308. Differential arms 312 are connected to a differential arm shaft 319 and rotate in unison.

By rotating differential arm shaft 319 either clockwise or counter clockwise this in turn will move shift arms 308 either to the left and/or to the right thereby increasing the distance between the moveable drive sheave 304 and the fixed drive sheave 306 on one side for example the right side and decreasing the distance between moveable drive sheave 304 and fixed drive sheave 306 on the other side namely the left side of the transmission.

Differential drive shaft 319 which are in turn connected to front and back differential arms 312 as rotated at steering link point 321 through a series of links which ultimately is connected to either a set of handle bars and/or steering wheel.

On the driven side of the continuously variable speed transmission and steering differential 300 there is a right driven axle 340, a left driven axel 342, a right fixed driven sheave 344, a right moveable driven sheave 348, a left fixed driven sheave 346 and a left moveable driven sheave 350 having a V-belt 352 mounted thereon.

Figure 11:
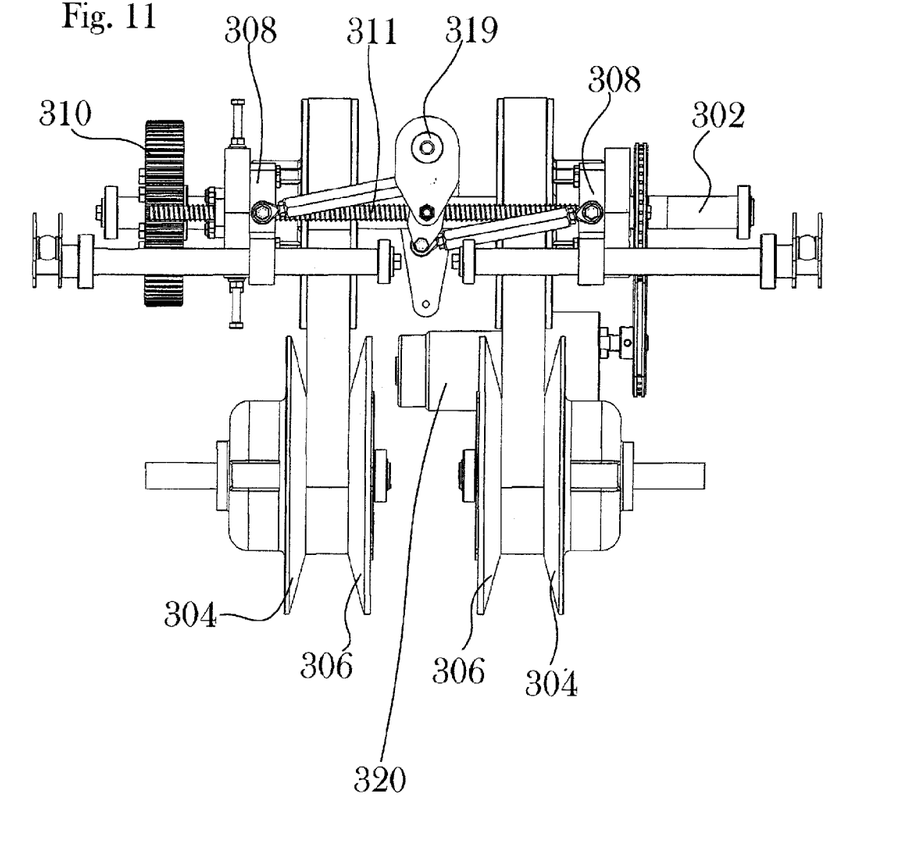
FIG. 11 is a schematic back plan view of the embodiment in FIG. 8 shown in high gear.

FIG. 8 for example shows maximum separation between the fixed drive sheave 306 and the moveable drive sheave 304 which would correspond to the lowest gear possible whereas the right fixed driven sheave 344 and right moveable driven sheave 348 are shown in the closest spacing possible again corresponding to the lowest gear ratio. In other words FIG. 8 shows the shift mechanism 303 in the lowest gear ratio. FIG. 11 shows the sheaves 304 and 306 as close as possible and in a high gear position.

Figure 12:
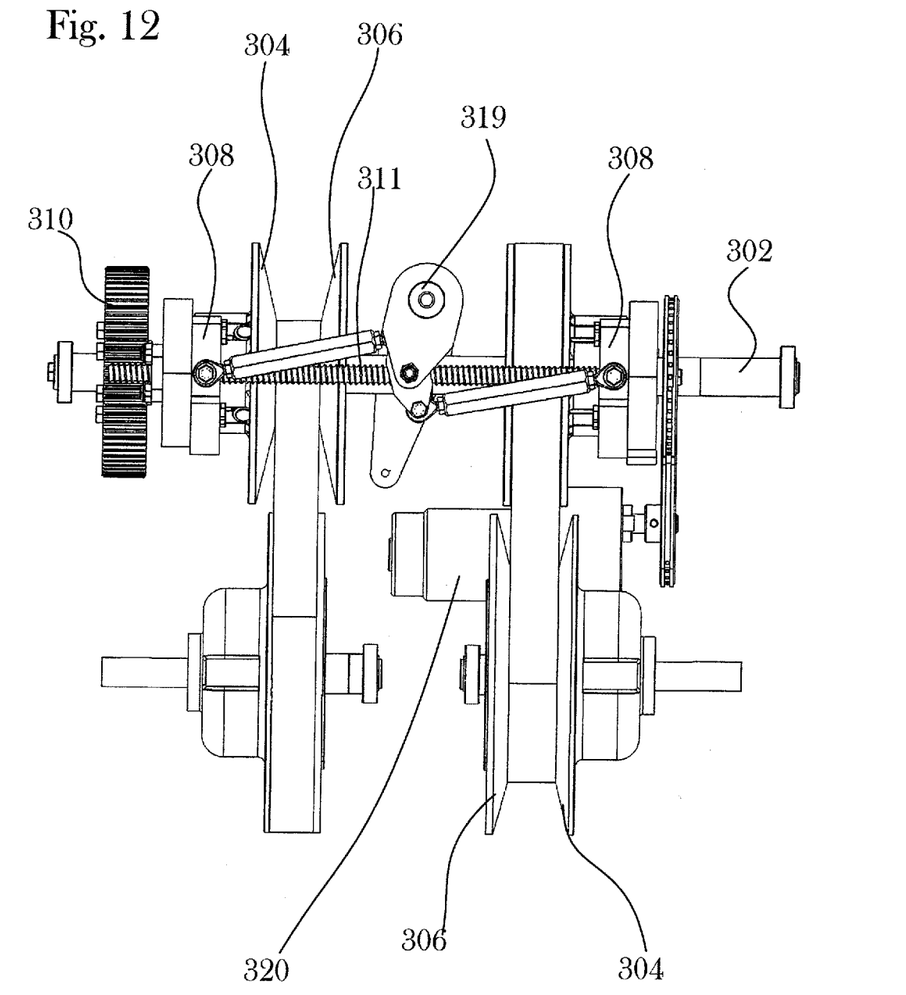
FIG. 12 is a schematic back plan view of the embodiment in FIG. 8 showing a maximum differential left turn.
Figure 13:
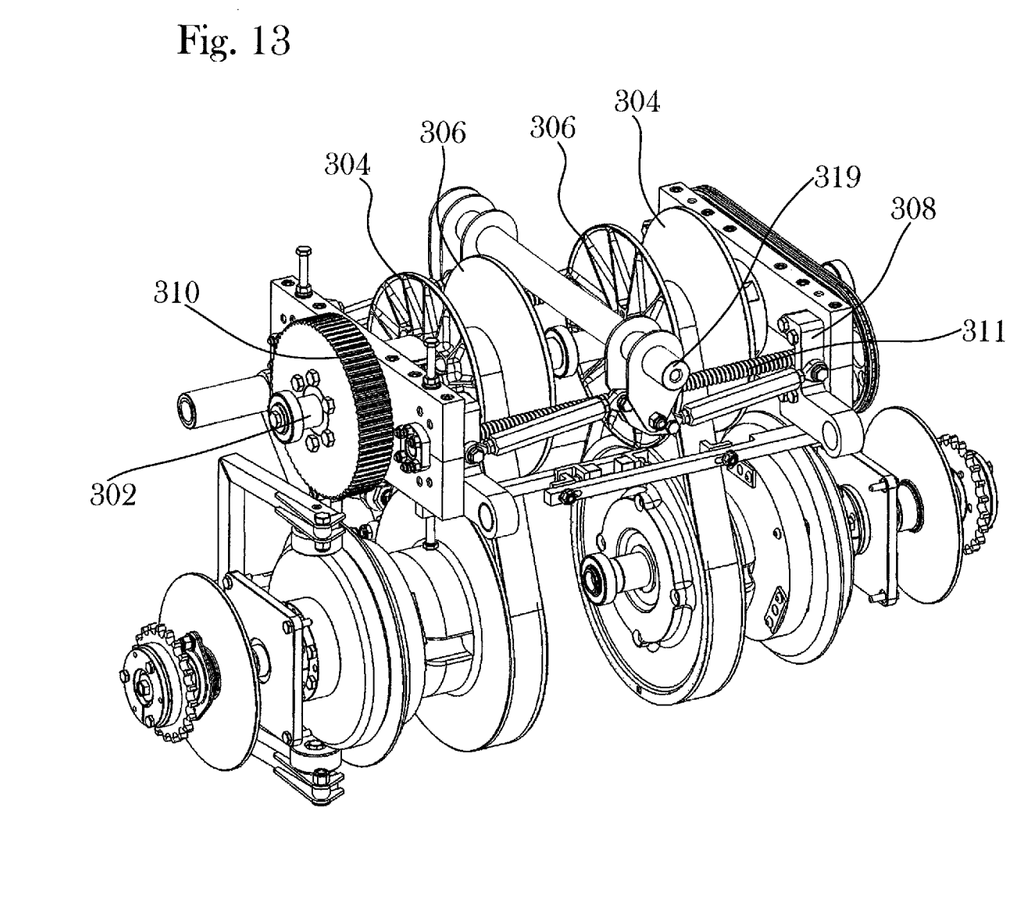
FIG. 13 is a schematic back perspective view of the embodiment shown in FIG. 8.
Figure 14:
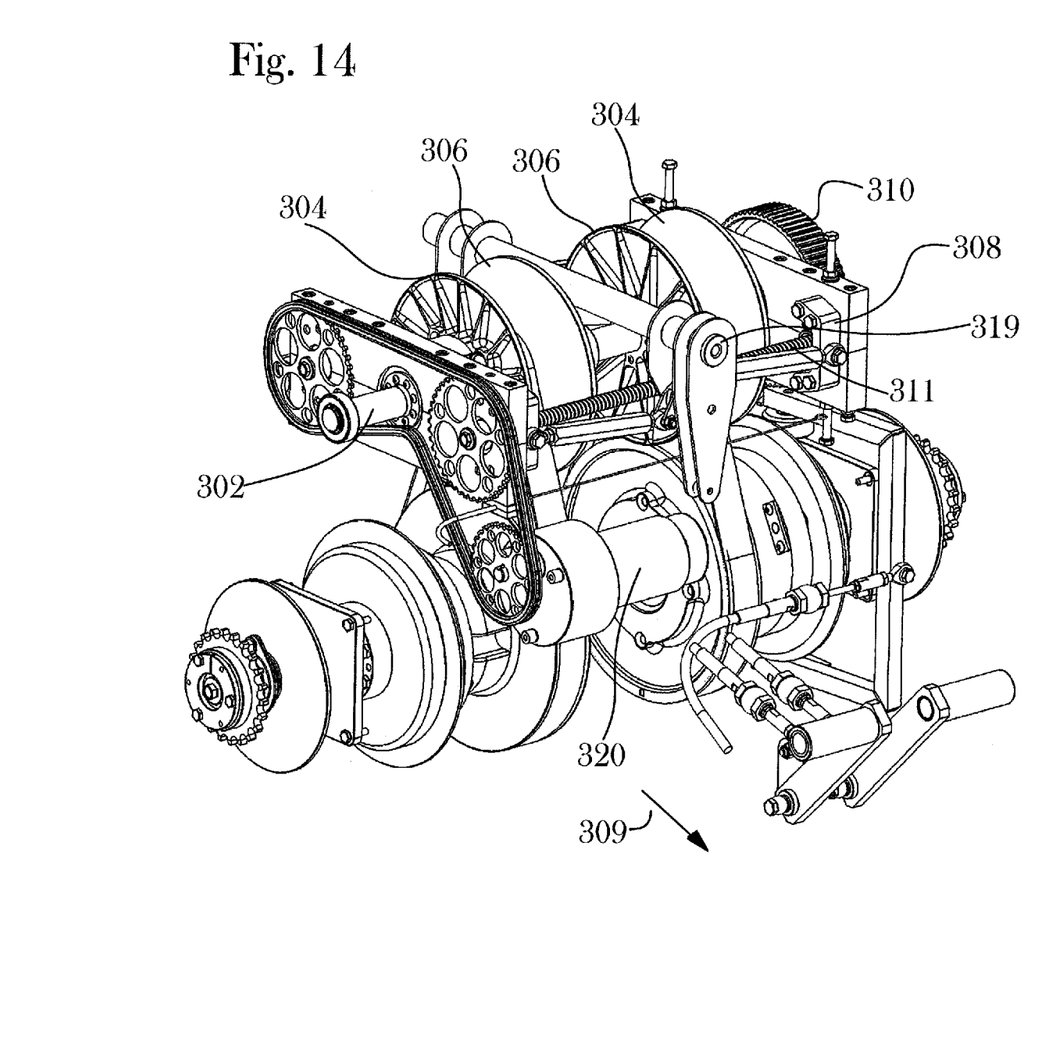
FIG. 14 is a front schematic perspective view of the embodiment shown in FIG. 8.
Figure 15:
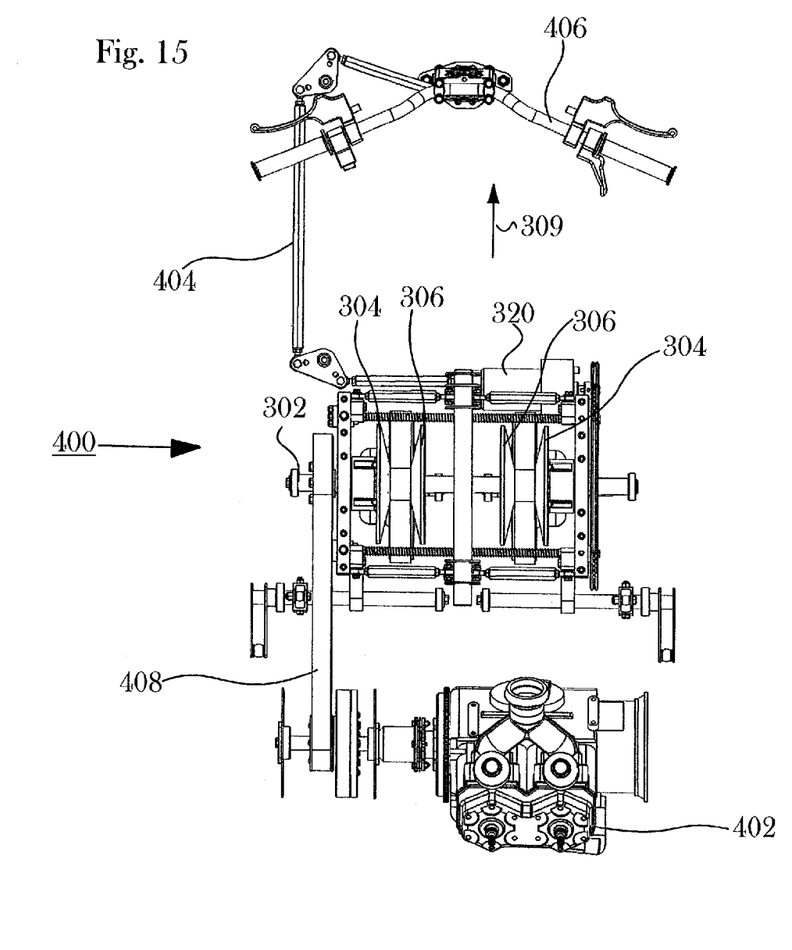
FIG. 15 is a top plan view of the continuously variable speed transmission and steering differential together with a propulsion motor and handle bars.

FIG. 8 also shows that the two sets of drive sheaves namely the right and left moveable drive sheaves 304 and fixed drive sheaves 306 are equally spaced meaning that there is no differential or steering input and therefore the differentials in the neutral are straight ahead position. In order to input steering one would urge steering link point 321 either left or right which in turn would turn differential arm shaft 319 which in turn would turn differential arms 312 which in turn would move shift arms 308 either to the right or to the left thereby inputting steering function. FIG. 12 shows maximum left turn differential input.

There is further anti-rotation and suspension axles 332 which have a double function first of all provide for attachments to the rear suspension and also prevent rotation of the continuously variable speed transmission and steering differential structure.

Referring now to FIG. 9 which is a partial schematic cross-sectional view taken through the centre of drive axle 302 which shows that moveable drive sheave 304 is attached to drive axle 302 with a keyed torque hub 374 which includes hub rollers 360.

Drive axle 302 is mounted onto drive axle bearing 331 and also bearings 330 on each end of the shaft. Sliding bushings 370 are mounted onto drive axle 302 and slide longitudinally along drive axle 302 as required.

Ball screw shafts 311 are mounted on to shift arms 308 with ball screw bearings 313.

Additionally drive axle 302 is also supported by centrally located drive axle bearings 372.

It should be apparent to persons skilled in the arts that various modifications and adaptation of this structure described above are possible without departure from the spirit of the invention the scope of which defined in the appended claim.

I claim:

1. A continuously variable speed transmission and steering differential comprising:
   a. a central drive axle driven by an external power source;
   b. two pairs of sheaves namely a left and right pair, mounted to the drive axle wherein each pair of sheaves includes a fixed drive sheave and a moveable drive sheave;
   c. two spaced apart shift arms for controlling positioning of the moveable drive sheaves;
   d. wherein narrowing a gap formed between the two spaced apart shift arms increases a gear ratio putting the transmission into a higher gear, thereby providing speed control;
   e. wherein shifting the shift arms either left or right varies the gear ratio between the left and right pair of sheaves, wherein this differential provides steering control.

* * * * *